(12) United States Patent
Kikuchi

(10) Patent No.: US 9,098,220 B2
(45) Date of Patent: Aug. 4, 2015

(54) PRINTING SYSTEM, INFORMATION PROCESSING APPARATUS, PRINTING METHOD, AND PROGRAM FOR A SERVERLESS PULL PRINTING SYSTEM

(75) Inventor: Hiroshi Kikuchi, Musashino (JP)

(73) Assignee: Canon Kabushiki Kaisha, Tokyo (JP)

( * ) Notice: Subject to any disclaimer, the term of this patent is extended or adjusted under 35 U.S.C. 154(b) by 394 days.

(21) Appl. No.: 13/284,657

(22) Filed: Oct. 28, 2011

(65) Prior Publication Data

US 2012/0127519 A1 May 24, 2012

(30) Foreign Application Priority Data

Nov. 22, 2010 (JP) ................................ 2010-259766

(51) Int. Cl.
  *G06F 3/12* (2006.01)
  *H04L 29/12* (2006.01)

(52) U.S. Cl.
  CPC .............. *G06F 3/1222* (2013.01); *G06F 3/122* (2013.01); *G06F 3/1238* (2013.01); *G06F 3/1267* (2013.01); *G06F 3/1285* (2013.01); *G06F 3/1268* (2013.01); *H04L 61/6072* (2013.01)

(58) Field of Classification Search
  None
  See application file for complete search history.

(56) References Cited

U.S. PATENT DOCUMENTS

| 6,985,243 | B1 * | 1/2006 | Matsueda | 358/1.15 |
| 8,045,195 | B2 * | 10/2011 | Ogashiwa et al. | 358/1.14 |
| 2002/0035941 | A1 * | 3/2002 | Nakao | 101/484 |
| 2003/0182367 | A1 * | 9/2003 | Ohara | 709/203 |
| 2004/0130744 | A1 * | 7/2004 | Wu et al. | 358/1.15 |
| 2004/0263900 | A1 | 12/2004 | Nguyen | |
| 2005/0052694 | A1 * | 3/2005 | Asano | 358/1.15 |
| 2005/0105130 | A1 * | 5/2005 | Hagiuda | 358/1.15 |
| 2006/0221358 | A1 * | 10/2006 | Takahashi | 358/1.1 |
| 2007/0133044 | A1 * | 6/2007 | Tanaka | 358/1.15 |
| 2008/0240766 | A1 * | 10/2008 | Sugihara | 399/81 |
| 2008/0304101 | A1 * | 12/2008 | Sasase | 358/1.15 |
| 2009/0190166 | A1 * | 7/2009 | Nakamura et al. | 358/1.15 |
| 2010/0058194 | A1 * | 3/2010 | Owen | 709/203 |
| 2010/0142989 | A1 * | 6/2010 | Oak | 399/80 |
| 2011/0063667 | A1 * | 3/2011 | Nishida | 358/1.15 |
| 2012/0023546 | A1 * | 1/2012 | Kartha et al. | 726/1 |

FOREIGN PATENT DOCUMENTS

| CN | 1613050 A | 5/2005 |
| CN | 101131630 A | 2/2008 |
| JP | 2002-351628 A | 12/2002 |
| JP | 2006-318245 A | 11/2006 |
| JP | 4-033857 A | 1/2008 |

* cited by examiner

*Primary Examiner* — Nicholas Pachol
(74) *Attorney, Agent, or Firm* — Canon U.S.A., Inc. IP Division

(57) ABSTRACT

A client PC generates and spools data for print according to a user's printing operation, and generates identification information for identifying itself from its own IP address to present it to the user. When the identification information is input in a multifunction peripheral, the multifunction peripheral converts the identification information into an IP address, and makes a request for transmission of print data to a client PC indicated by the IP address. In response to the request, the client PC generates print data using the spooled data and transmits the print data to the multifunction peripheral. The multifunction peripheral receives and prints the print data.

12 Claims, 14 Drawing Sheets

FIG. 8

| DOCUMENT NAME | PAGE | DATE AND TIME |
|---|---|---|
| ☐ FINANCIAL STATEMENTS | 23 P | 07/14/10:19 |
| ☐ TODAY'S WEATHER | 1 P | 07/14/10:20 |
| ☐ MINUTES OF REGULAR MEETING | 4 P | 07/14/10:25 |
|  |  |  |

[SERVERLESS PULL PRINTING]

DETAILED INFORMATION | DELETE | START PRINTING

FIG. 9

| [SERVERLESS PULL PRINTING] | |
|---|---|
| COMPUTER NAME | NUMBER OF JOBS |
| ☐ PC002 | 3 JOBS |
| ☐ PC005 | 1 JOB |
| ☐ PC003 | 2 JOBS |
| | |

RETURN  OK

FIG. 10

```
[SERVERLESS PULL PRINTING]

A PC WHICH PERFORMED PRINTING COULD NOT BE FOUND.

CHECK THAT PC IS POWERED ON AND CONNECTED
TO NETWORK.
CHECK PIN CODE, AND EXECUTE PRINTING AGAIN.

OK
```

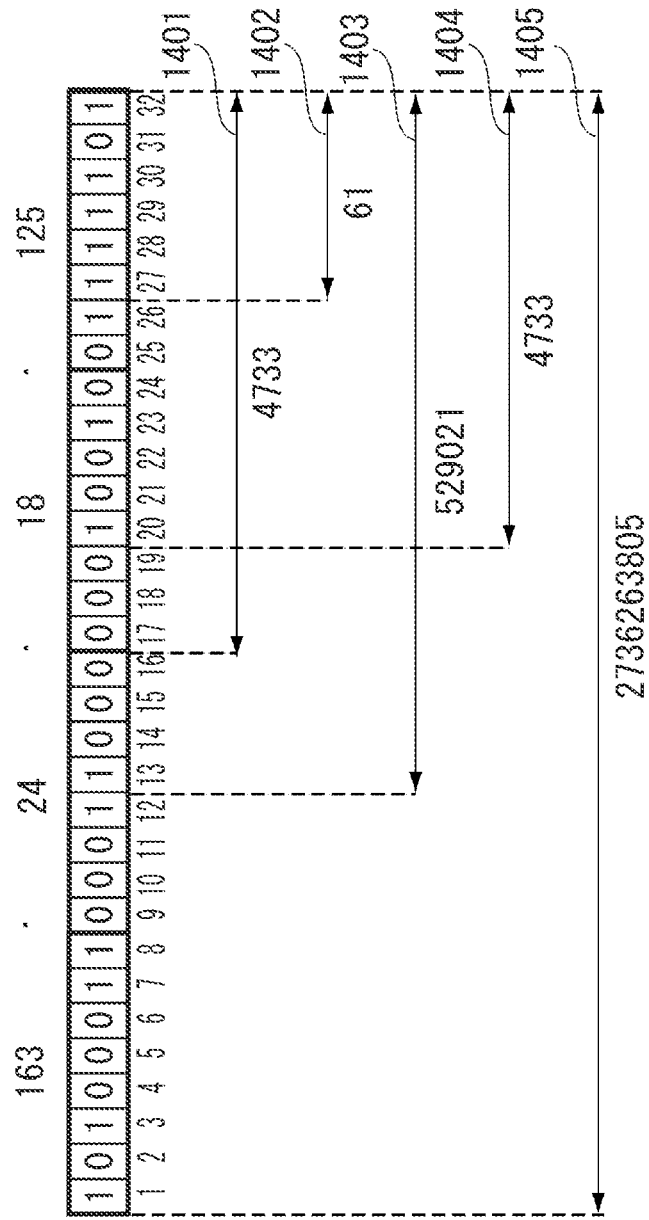

US 9,098,220 B2

PRINTING SYSTEM, INFORMATION PROCESSING APPARATUS, PRINTING METHOD, AND PROGRAM FOR A SERVERLESS PULL PRINTING SYSTEM

BACKGROUND OF THE INVENTION

1. Field of the Invention

The present invention relates to a pull printing system that does not utilize a print server or the like.

2. Description of the Related Art

Conventionally, there has been discussed a printing system of what is referred to as "pull printing" in which a user makes a print request by operating a printing apparatus, on print data temporarily stored in a server, so that the print data acquired from the server can be output by the printing apparatus (see Japanese Patent No. 4033857). Accordingly, the user can output print data from a desired printing apparatus, rather than output to a specific printing apparatus, during printing from an application.

A serverless pull printing system is also discussed (see Japanese Patent Application Laid-Open No. 2006-318245). In the serverless pull printing system, instead of temporarily storing print data on a server, the print data is temporarily stored on a client personal computer (PC) which instructs printing. Thus, the print data can be output from a desired printing apparatus by making a print request to the client PC.

In the serverless pull printing system, it is necessary to identify the client PC from the printing apparatus to connect the printing apparatus and the client PC to each other, but it is difficult because generally a plurality of client PCs exist on a network.

In a system discussed in Japanese Patent Application Laid-Open No. 2006-318245, network connection is established from a client PC to all existing printing apparatuses at the time of printing from an application. Then, when a user performed authentication by the printing apparatus, the client PC cancels connection with printing apparatuses except for the authenticated printing apparatus. However, it is necessary in this method to establish connection with all printing apparatuses, there is an issue that a load will be placed on the network or the printing apparatuses. Further, because broadcast is used for the connection request, there is another issue that connection across a subnet cannot be established.

SUMMARY OF THE INVENTION

The present invention is directed to a mechanism capable of connecting a desired printing apparatus and a client PC to perform pull printing in a serverless pull printing system without establishing communication between a needless printing apparatuses and the client PC.

According to an aspect of the present invention, there is provided a printing system in which one of a plurality of information processing apparatuses and printing apparatuses are connected to a network. The information processing apparatus includes a spooling unit configured to generate and spool data for print as a function of a print module of the information processing apparatus according to a user's printing operation, a generation unit configured to generate identification information for identifying the information processing apparatus from an internet protocol (IP) address of the information processing apparatus, a presentation unit configured to present the identification information generated by the generation unit to a user, and a transmission unit configured to transmit print data generated by using the data spooled in the spooling unit to the printing apparatus in response to a request from the printing apparatus. The printing apparatus includes an input unit configured to input the identification information, a conversion unit configured to convert the identification information input from the input unit into an IP address, a request unit configured to make a request for transmission of the print data to the information processing apparatus indicated by the IP address converted by the conversion unit, and a printing unit configured to receive and print the print data transmitted from the information processing apparatus in response to the request made by the request unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 illustrates an example of a job list display screen to be displayed on a display unit of the operation unit of the multifunction peripheral in step S608 in FIG. 6.

FIG. 9 illustrates an example of a computer selection screen to be displayed on the operation unit of the multifunction peripheral when a "select from PC list" button in FIG. 7 is pressed.

FIG. 10 illustrates an example of an error screen to be displayed on the display unit of the operation unit of the multifunction peripheral in step S611 in FIG. 6.

FIG. 14 illustrates an internet protocol (IP) address "163.24.18.125" of the client PC expressed in a binary number in the exemplary embodiment.

DESCRIPTION OF THE EMBODIMENTS

Various exemplary embodiments, features, and aspects of the invention will be described in detail below with reference to the drawings.

Figure 1:
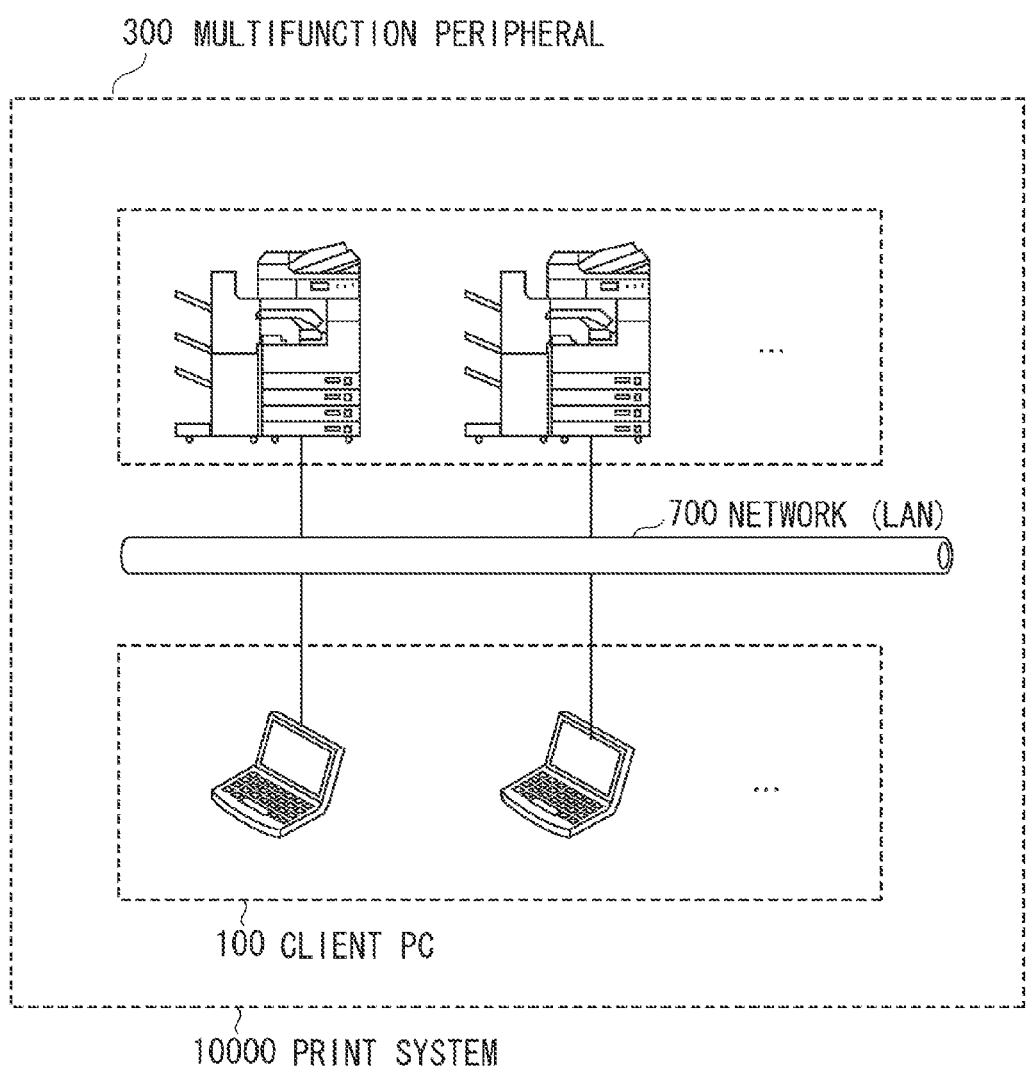
FIG. 1 is a system configuration diagram illustrating an example of a configuration of a printing system to which an information processing apparatus and a printing apparatus according to the present invention can be applied.

FIG. 1 is a system configuration diagram illustrating an example of a configuration of a print system to which an information processing apparatus and a printing apparatus according to the present invention can be applied. As illustrated in FIG. 1, a print system 10000 according to the present exemplary embodiment is configured such that one or more client PCs 100 (e.g., for each user) and one or more multifunction peripherals 300 (e.g., for each room) are connected to one another via a local area network (LAN) 700.

Figure 2:
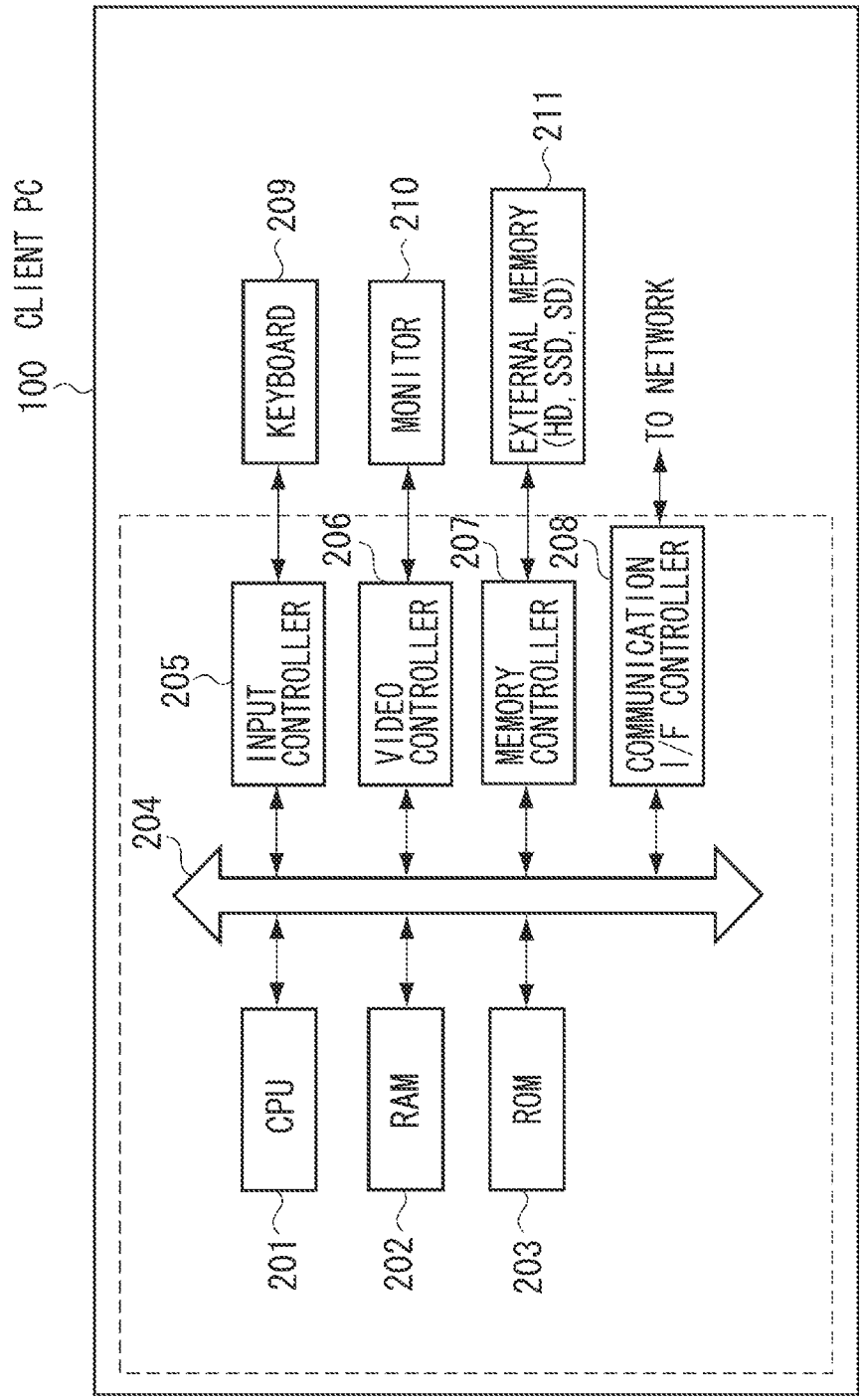
FIG. 2 is a block diagram illustrating a hardware configuration of the information processing apparatus which can be applied to a client PC illustrated in FIG. 1.

FIG. 2 is a block diagram illustrating a hardware configuration of the information processing apparatus which can be applied to the client PC 100 illustrated in FIG. 1. In FIG. 2, a central processing unit (CPU) 201 centrally controls each of devices and controllers connected to a system bus 204. A read-only memory (ROM) 202 or an external memory 211 store a basic input/output system (BIOS) and an operating system program (hereinafter OS) serving as a control program of the CPU 201, and various types of programs described below necessary for realizing the functions executed by the respective PCs.

A random-access memory (RAM) 203 functions as a main memory, a work area, and the like of the CPU 201. The CPU 201 loads programs necessary for execution of processing to the RAM 203 from the ROM 202 or the external memory 211, and realizes various operations by executing the loaded programs.

An input controller 205 controls an input from a pointing device such as a keyboard 209 or a mouse (not illustrated). A video controller 206 controls display onto a monitor 210. Generally, the monitor 210 is a display device such as a liquid crystal display or a cathode ray tube (CRT).

A memory controller 207 controls access to the external memory 211 including a hard disk, a solid state drive (SSD), and a secure digital (SD) memory card which store boot programs, various applications, user files, various pieces of data, and the like.

A communication interface (I/F) controller 208 is used to perform connection and communication with external devices via a network (e.g., the LAN 700 illustrated in FIG. 1), and executes communication control processing in the network. In the present exemplary embodiment, communication using a Transmission Control Protocol/Internet Protocol (TCP/IP) is possible.

The CPU 201 enables display on the monitor 210 by executing, for example, outline font rasterize processing on a display information region in the RAM 203. Further, the CPU 201 enables a user to issue an instruction with a mouse cursor (not illustrated) or the like on the monitor 210.

Various types of programs described below for realizing the present invention are recorded in the external memory 211, and are executed by the CPU 201 by being loaded into the RAM 202 as need arises.

Figure 3:
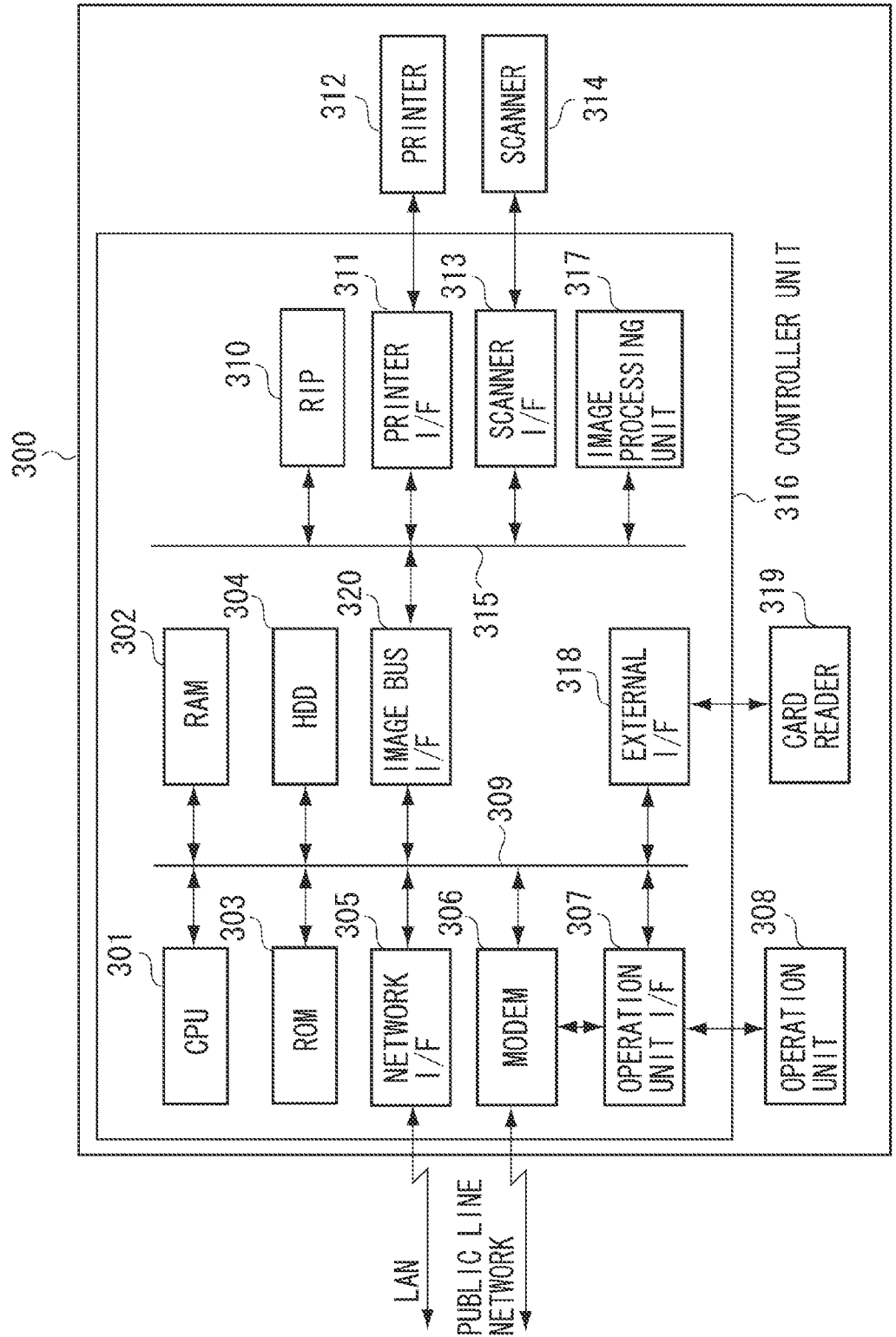
FIG. 3 is a block diagram illustrating an example of a hardware configuration of a controller unit of a multifunction peripheral illustrated in FIG. 1.

FIG. 3 is a block diagram illustrating an example of a hardware configuration of a controller unit of the multifunction peripheral 300 illustrated in FIG. 1. In FIG. 3, a controller unit 316 is connected to a scanner 314 serving as an image input device and a printer 312 serving as an image output device. Further, the controller unit 316 is connected to an external LAN or the like to perform input and output of image data and device information.

In the controller unit 316, a CPU 301 is a processor that controls the entire system. A RAM 302 serves as a system work memory for enabling the CPU 301 to operate, and also serves as a program memory for recording programs and an image memory for temporarily recording image data.

A ROM 303 stores therein a boot program and various control programs of the system. A hard disk drive (HDD) 304 stores therein various programs for controlling the system, image data, and so forth. In place of the HDD, the SSD or the like may be used.

An operation unit interface (operation unit I/F) 307 is an interface unit with an operation unit (UI) 308, and outputs to the operation unit 308 image data to be displayed on the operation unit 308. Further, the operation unit I/F 307 transmits to the CPU 301 information (e.g., user information) which is input by a user of the present system user from the operation unit 308. The operation unit 308 is provided with a display unit including a touch panel, so that the user can input various instructions by pressing (e.g., touch with a finger) a button displayed on the display unit.

A network I/F 305 is connected to a network (LAN) to perform input and output of data. A modulator-demodulator (MODEM) 306 is connected to a public line to perform input and output of data for transmission and reception of facsimile (FAX).

An external I/F 318 is an I/F unit which accepts external inputs such as a universal serial bus (USB), Institute of Electrical and Electronic Engineers (IEEE) 1394, a printer port, and RS-232C. In the present exemplary embodiment, a card reader 319 for reading an integrated circuit (IC) card which is necessary for authentication is connected to the external I/F unit 318.

The CPU 301 controls reading the information from an IC card by the card reader 319 via the external I/F 318, and can acquire information read from the IC card. The above devices (301 through 307, and 318) are arranged on the system bus 309.

An image bus I/F 320 is a bus bridge which connects the system bus 309 and an image bus 315 which transfers image data at high speed, and converts data structure.

The image bus 315 may include a peripheral component interconnect (PCI) bus or IEEE 1394. Devices arranged on the image bus 315 are as follows.

A raster image processor (RIP) 310 rasterizes vector data such as a page description language (PDL) code into a bitmap image. A printer I/F 311 connects the printer 312 and the controller unit 316 and performs synchronous/asynchronous conversion of image data. A scanner I/F 313 connects the scanner 314 and the controller unit 316 and performs synchronous/asynchronous conversion of the image data.

An image processing unit 317 performs correction, processing, edition on input image data, and performs correction of a printer and resolution conversion on printout image data. In addition, the image processing unit 317 performs rotation of the image data, and performs compression/decompression processing including Joint Photographic Experts Group (JPEG) on multi-valued image data, and compression/decompression processing including Joint Bi-level Image Group (JBIG), modified modified READ (MMR), and modified Huffman (MH) to binary image data.

The scanner 314 illuminates and scans an image on paper as a document by a charge-coupled device (CCD) line sensor and converts the image into electrical signal as raster image data. When an apparatus user sets document sheets on a tray of a document feeder (not illustrated) and inputs an instruction to activate reading from the operation unit 308, the CPU 301 instructs the scanner 314 to read the image of the document by feeding the document sheets one by one from the document feeder.

The printer 312 is a unit which converts the raster image data into an image on a sheet, and a method thereof includes an electrophotographic method using a photosensitive member or a photosensitive member belt or an inkjet method, but any method may be used. Activation of the printing operation is started by an instruction from the CPU 301. The printer 312 includes a plurality of paper feeding stages so that different paper sizes or different paper orientations can be selected, and includes paper cassettes corresponding thereto.

The operation unit 308 includes a liquid crystal display (LCD) display unit on which a touch panel sheet is attached. The operation unit 308 displays an operation screen of the system, and, when a displayed key is pressed, transmits position information of the pressed key to the CPU 301 via the operation unit I/F 307. The operation unit 308 further includes various operation keys, such as a start key, a stop key, an ID key, and a reset key.

The start key of the operation unit 308 is used, for example, when reading operation of document images is started. In the central part of the start key, there is two-color light emitting diode (LED) of green and red, which indicates whether the start key is ready for use by the color. The stop key of the operation unit 308 is operable to stop operation in progress. The ID key of the operation unit 308 is used when a user ID of the user is input. The reset key is used when setting from the operation unit is initialized.

The card reader 319 reads information stored in an IC card (e.g., Sony's Felica (registered trademark)) by control from the CPU 301 and notifies the read information to the CPU 301 via the external I/F 318.

By the configuration as described above, the multifunction peripheral 300 can transmit image data read from the scanner 314 to the LAN 700, and can print the print data received from the LAN 700 by the printer 312.

In addition, the multifunction peripheral 300 can perform FAX transmission of the image data read from the scanner 314 to a public line by the modem 306, and can output the image data received by FAX from the public line by the printer 312.

A flow of processing in the client PC 100 in the serverless pull printing system according to the present exemplary embodiment will be described below with reference to FIG. 4.

In the client PC 100 which uses the present system, a print module according to the present exemplary embodiment needs to be installed in advance in the external memory 211. The print module includes a dedicated printer driver and a service for serverless pull printing, and operates in corporation with each other. The user can use the present print system by logging in to the client PC 100, selecting the above-described dedicated printer driver, and instructing printing from arbitrary application program operating on the client PC.

Figure 4:
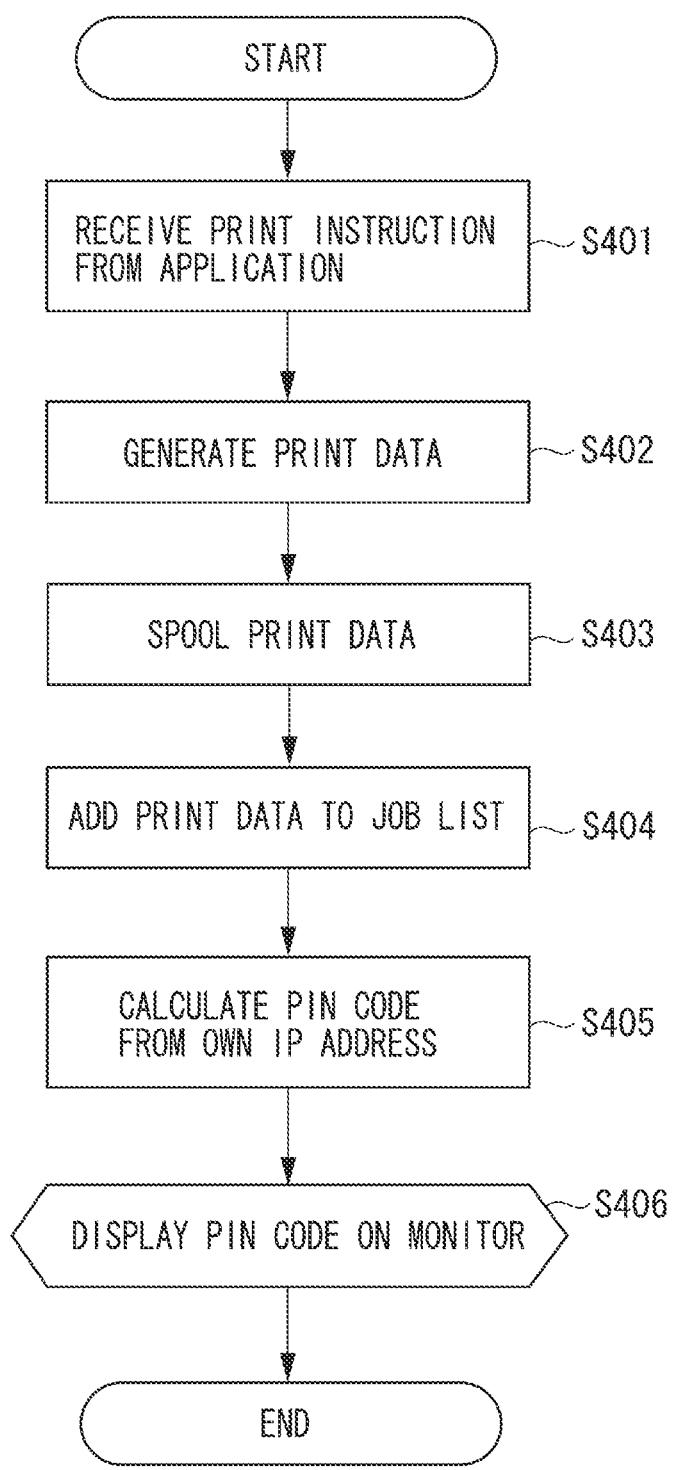
FIG. 4 is a flowchart illustrating an example of processing of the client PC at the time of print execution.

FIG. 4 is a flowchart illustrating an example of processing of the client PC 100 during print execution. The processing in the flowchart is realized by the CPU 201 in the client PC 100 executing a computer-readable program recorded in the external memory 211 (the print module according to the present exemplary embodiment). The processing of the CPU 201 realized by the CPU 201 executing the print module according to the present exemplary embodiment will be described below.

First, an application performs print processing according to the user's printing operation, and issues a print instruction to the print module.

In step S401, the print module receives the print instruction from the application. In step S402, the print module generates data to be printed (print data) based on the received data via a graphic engine. The print data generated here has a format which does not depend on a printing apparatus (e.g., Enhanced Metafile (EMF) format), and print settings can be freely changed before print processing is actually performed.

Next, in step S403, the print module stores (spools) the print data generated in step S402 in a predetermined storage location (spool region within the external memory 211) on the client PC 100.

In step S404, the print module adds the print data spooled in step S403 to a job list managed by the print module. The job list includes document names of the print data pieces spooled by the print module and information such as the number of pages and printed date and time. At this time, the print module only spools the print data, and does not perform transmission to the printing apparatus (the multifunction peripheral 300).

Figure 5:
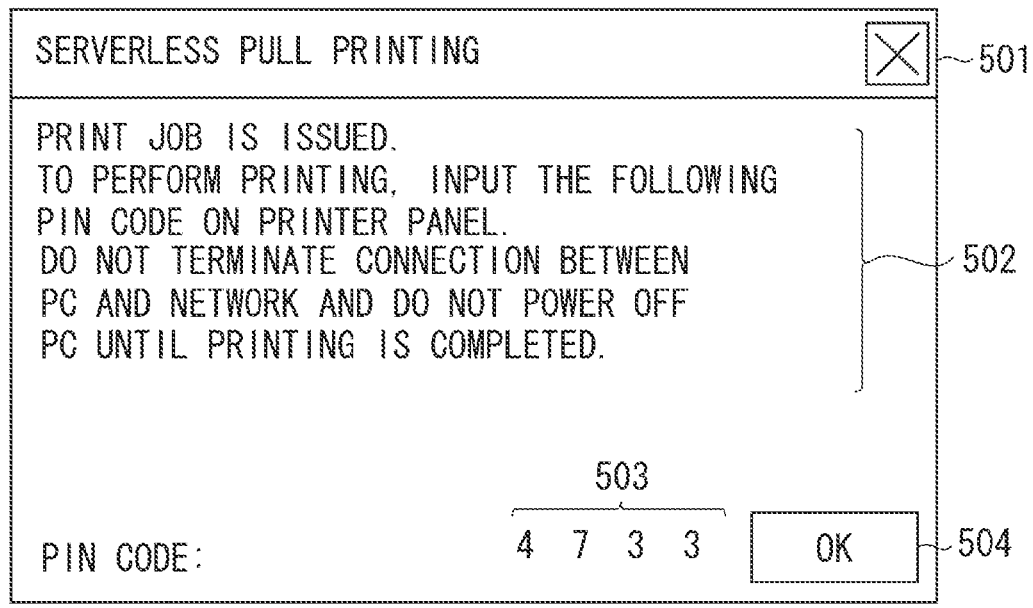
FIG. 5 illustrates an example of a dialogue to be displayed on a monitor at the timing in step S406 in FIG. 4.

Next, in step S404, the print module calculates a PIN code from an IP address of the PC 100 in which the print module itself operates. Then in step S405, the print module displays the calculated PIN code on the monitor 210. FIG. 5 illustrates an example of a dialogue displayed on the monitor 210 at a timing in step S406 in FIG. 4.

In FIG. 5, a dialogue 501 is displayed on the monitor 210 at the timing in step S406 in FIG. 4. In the dialogue 501, there are displayed a PIN code 503 and a message 502 which indicates that the print job has been issued and prompts (warns) the user not to terminate the connection between the PC and the network or to power off the PC until actual print processing is completed. In other words, the message 502 gives the user the warning that the client PC should be maintained in a state in which it can communication with each printer (the multifunction peripheral 300) until printing of the spooled print data is completed (in order to complete the printing).

In the example in FIG. 5, "4733" is displayed as the PIN code. The PIN code is identification information for identifying the client PC itself (IP address of the client PC itself). A calculation method for the PIN code will be described below with reference to FIG. 11 to FIG. 14.

When an OK button 504 is pressed, the dialogue 501 is closed. At this point, which multifunction peripheral will be used for printing is not decided yet, from among a plurality of multifunction peripherals 300 on the network. Then, the user goes directly to the multifunction peripheral 300 where the user wishes to perform printing, and executes printing by operating the UI of the multifunction peripheral 300.

Figure 6:
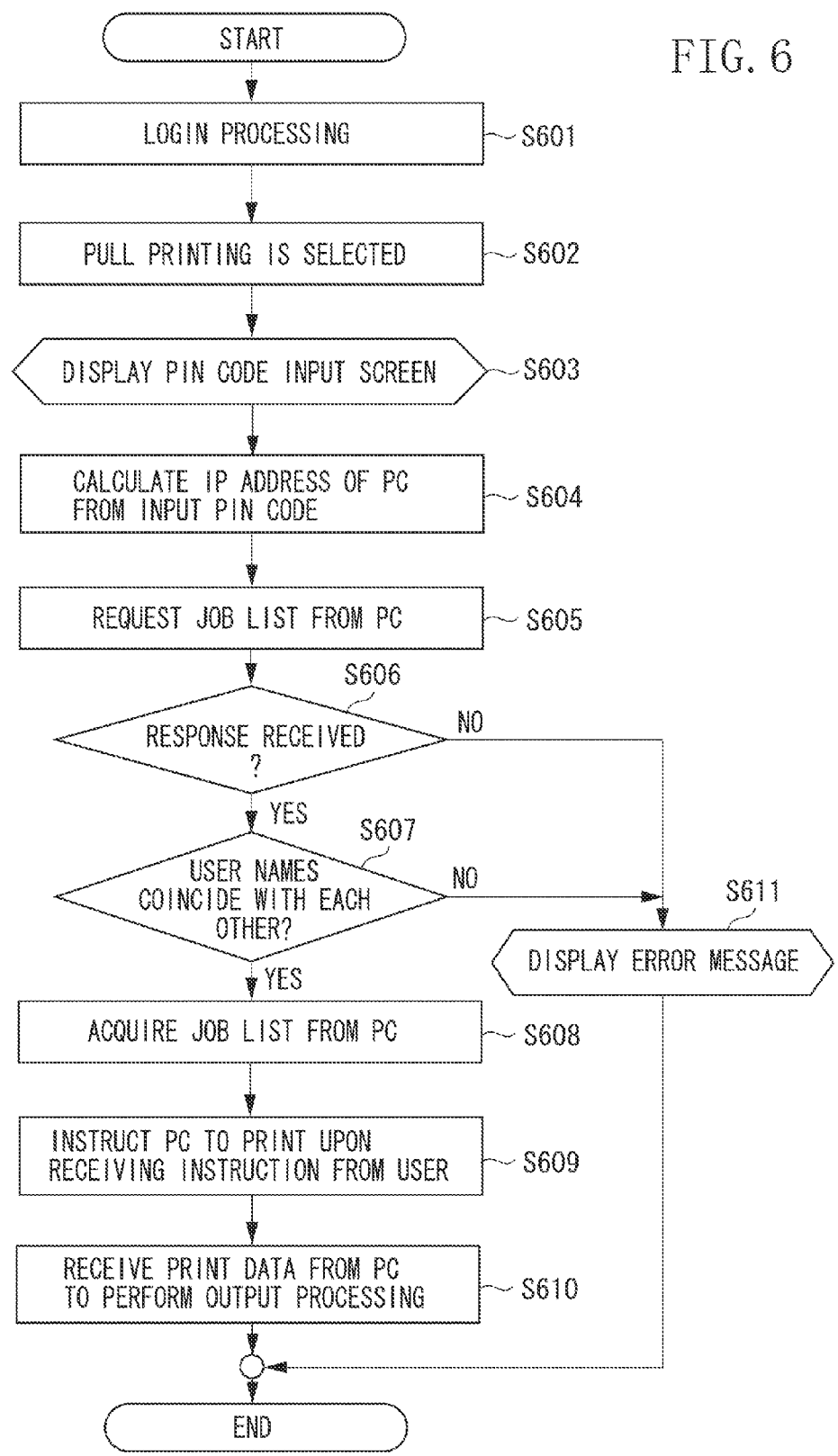
FIG. 6 is a flowchart illustrating an example of processing of a multifunction peripheral at the time of print output.

A flow of processing within the multifunction peripheral 300 in the serverless pull printing system according to the present exemplary embodiment will be described below with reference to FIG. 6. FIG. 6 is a flowchart illustrating an example of the processing of the multifunction peripheral 300 during printout, which corresponds to the processing of the multifunction peripheral 300 until the user actually executes printing in front of the multifunction peripheral 300. The processing of the flowchart is realized by the CPU 301 within the multifunction peripheral 300 executing a computer-readable program recorded in the ROM 303.

First, the user performs operation to log in to the multifunction peripheral 300 by holding the IC card over the card reader 319 or operating the ID key of the operation unit 308 to input the user ID or the like. In step S601, upon receiving the operation, the CPU 301 of the multifunction peripheral 300 performs the user login processing. When the login is successfully accepted, the CPU 301 displays a menu screen and a user name of the logged-in user on the UI of the operation unit 308.

Figure 7:
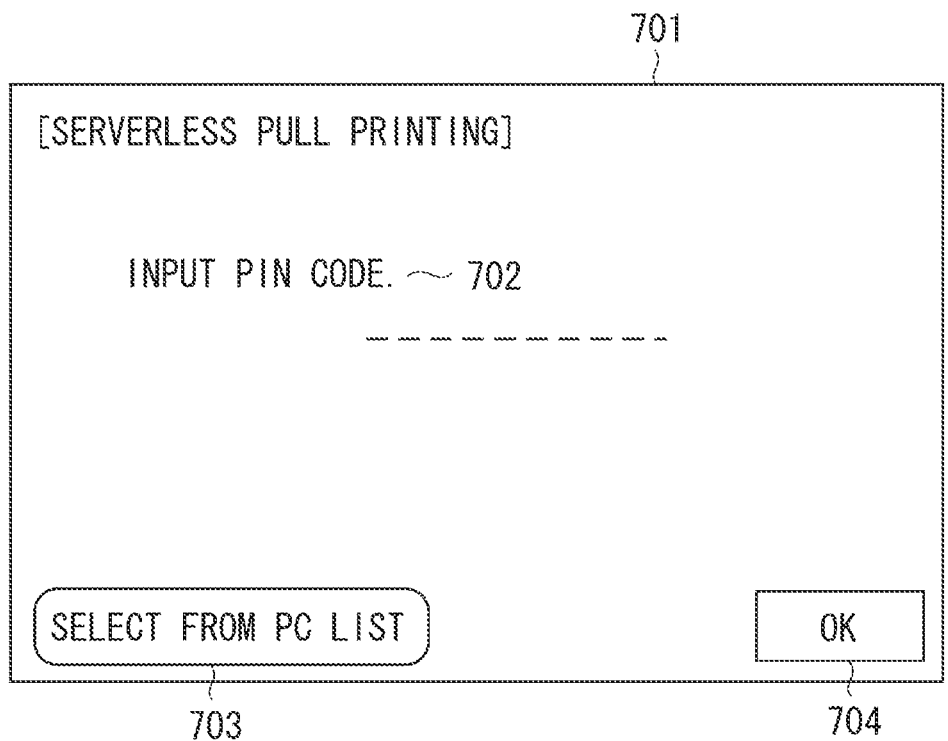
FIG. 7 illustrates an example of a personal identification number (PIN) code input screen to be displayed on an operation unit of the multifunction peripheral in step S603 in FIG. 6.

In step S602, "pull print" is selected from the menu screen by the user operating the UI. In step S603, the CPU 301 of the multifunction peripheral 300 displays a screen for inputting a PIN code as illustrated in FIG. 7 on the display unit of the operation unit 308. Accordingly, the processing of serverless pull printing is started.

FIG. 7 illustrates an example of a PIN code input screen to be displayed on the operation unit 308 of the multifunction peripheral 300 in step S603 in FIG. 6.

When the user inputs the PIN code to a region 702 of the PIN code input screen 701 by operating the UI and touches an OK button 704, in step S604, the CPU 301 of the multifunction peripheral 300 calculates an IP address based on a value of the input PIN code. A method for calculating an IP address from a PIN code will be described below with reference to FIG. 11 to FIG. 14.

Next, in step S605, the CPU 301 of the multifunction peripheral 300 requests a job list from the client PC 100 of the IP address calculated in step S604. The print module of the client PC 100 which has received the request transmits, as a response to the request, the logged-in user name of the client PC 100 and the job list managed by the print module to the multifunction peripheral 300. The print module of the client PC 100 does not perform the above-described response, if the print data is not registered in the job list managed by the print module (if the job list is empty).

Then, in step S606, the CPU 301 of the multifunction peripheral 300 determines whether a response from the client PC 100 with the above-described IP address has been received. If it is determined that the response has been received from the client PC 100 with the above-described IP address (YES in step S606), the CPU 301 of the multifunction peripheral 300 advances the processing to step S607.

In step S607, the CPU 301 of the multifunction peripheral 300 determines whether a user name included in the response from the above-described client PC 100 is identical to the user name of the logged-in user in step S601.

Then, if it is determined that the user name included in the response from the above-described the client PC 100 is identical to the user name of the logged-in user in step S601 (YES in step S607), the CPU 301 of the multifunction peripheral 300 advances the processing to step S608.

In step S608, the CPU 301 of the multifunction peripheral 300 acquires the job list included in the response from the above-described client PC 100, and displays a job list display screen 801 as illustrated in FIG. 8 on the display unit of the operation unit 308.

FIG. 8 illustrates an example of the job list display screen to be displayed on the display unit of the operation unit 308 of the multifunction peripheral 300 in step S608 in FIG. 6. The job list display screen 801 displays the job list managed by the print module within the client PC 100 and displays a document name 802, a number of pages 803, and a date and time (printed date and time) 804. In the job list display screen 801, the user can select a job and press (touch) a "start printing" button 807. Also, the user can press (touch) a "detailed information" button 805 to display detailed information of the selected job, and press a "delete" button 806 to delete the selected job.

When the user selects a job by the UI operation and presses the "start printing" button 807 (instruct the printing), in step S609, the CPU 301 of the multifunction peripheral 300 transmits a print instruction including a document name of the selected job to the above-described client PC 100.

The print module of the client PC 100, which has received the print instruction, acquires from the spool region of the client PC 100, print data corresponding to the document name included in the print instruction, and performs control to transmit the print data to the multifunction peripheral 300.

A control operation of the print module of the client PC 100 when the print data is transmitted is described in more detail to supplement. The print module extracts manufacturer information and model information transmitted sent along with the print instruction from the multifunction peripheral 300 and determines whether the corresponding printer driver is installed in the client PC.

If the printer driver has been already installed, the print module takes out the print data in the EMF format from the spool region and causes the printer driver to convert into print data into Page Description Language (PDL) print data for the multifunction peripheral 300 (to convert the print data into one for the printing apparatus to which the print instruction is issued). Then, the printer driver transmits the converted print data to the multifunction peripheral 300.

On the other hand, a case in which the print module of the client PC 100 determines that a printer driver corresponding to the multifunction peripheral 300 is not installed in the client PC will be described. In this case, the print module searches a storage area of the client PC or devices on the network for a printer driver corresponding to the manufacturer information and the model information. If the printer driver is found, the print module acquires the printer driver and controls execution of installation processing.

Then, the print module takes out the print data in the EMF format from the spool region and causes the installed printer driver to convert it into the print data in the PDL for the multifunction peripheral 300. The printer driver transmits the converted print data to the multifunction peripheral 300.

In step S610, the CPU 301 of the multifunction peripheral 300 acquires the print data transmitted from the above-described client PC 100, performs actual print processing of the print data by the printer 312, and ends print processing.

The job list display screen 801 may be configured to be capable of performing print settings for each job (such as color/monochrome settings, two-sided setting, layout setting such as 2in1, settings for stapling or bookbinding, paper discharge setting, and paper feeding setting), and of performing printing according to the above-described print settings during print processing in step S610.

If it is determined that a response from the client PC 100 with the above-described IP address has not been received (NO in step S606), the CPU 301 of the multifunction peripheral 300 determines as an error, and advances the processing to step S611. Further, if it is determined that the user name included in the response from the above-described client PC 100 is not identical to the user name of the logged-in user in step S601 (NO in step S607), the CPU 301 of the multifunction peripheral 300 determines as an error, and advances the processing to step S611.

In step S611, the CPU 301 of the multifunction peripheral 300 displays an error screen 1001 as illustrated in FIG. 10 on the display unit of the operation unit 308, and ends the print processing.

The screen 701 in FIG. 7 is a screen which prompts the user to input the PIN code in the multifunction peripheral 300 as described above, but the user needs to memorize the PIN code to input it. However, the user may have forgotten the PIN code sometimes. Thus, the screen 701 in FIG. 7 includes a "select from PC list" button 703 for the user who has forgotten the PIN code.

When the "select from PC list" button 703 is pressed, the CPU 301 of the multifunction peripheral 300 calculates all possible IP addresses on the network based on the PIN code setting illustrated in FIG. 11 and FIG. 12 described below. Then, the CPU 301 of the multifunction peripheral 300 requests the job list request from the all client PCs 100 with the calculated IP addresses.

If a client PC which has returned a reply in response to the job list request and has the identical user name is only one, the CPU 301 of the multifunction peripheral 300 displays the job list display screen 801 as illustrated in FIG. 8 based on the acquired job list, as described above.

On the other hand, if there are a plurality of the client PCs which have returned reply in response to the job list request and have the identical user name, the CPU 301 of the multi-function peripheral 300 displays a computer selection screen 901 as illustrated in FIG. 9 on the display unit of the operation unit 308.

FIG. 9 illustrates an example of the computer selection screen to be displayed on the operation unit 308 of the multifunction peripheral 300, if the "select from PC list" button 703 in FIG. 7 is pressed. On the computer selection screen 901, the computer names of all the client PCs 100 which have responded are listed in a row 902, and the numbers of jobs included in respective job lists are listed in a row 903.

On the computer selection screen 901, when a return button 904 is pressed, the CPU 301 of the multifunction peripheral 300 changes the display to the PIN code input screen in FIG. 7. When the user selects a computer including a job which the user wishes to print on the computer selection screen 901 and presses an OK button 905, the CPU 301 of the multifunction peripheral 300 displays the job list display screen 801 as illustrated in FIG. 8 based on the job list acquired from the PC selected on the computer selection screen 901.

When a response has not returned from any client PC, the CPU 301 of the multifunction peripheral 300 determines as an error, and advances the processing to step S611. In step S611, the CPU 301 of the multifunction peripheral 300 displays the error screen 1001 as illustrated in FIG. 10 on the display unit of the operation unit 308, and ends the print processing.

FIG. 10 illustrates an example of the error screen to be displayed on the display unit of the operation unit 308 of the multifunction peripheral 300 in step S611 in FIG. 6. In the error screen 1001, when an OK button 1002 is pressed (touched), the CPU 301 of the multifunction peripheral 300 closes the error screen 1001 and changes the display to the initial screen.

The overall flow of the print system according to the present invention has been described. By using the PIN code, the printing apparatus and the client PC can be connected with each other without performing communications between unnecessary printing apparatuses and the client PC. Since connection is established by directly designating the IP address, connection across the subnet can be established.

In the job list display screen 801 in FIG. 8, when a job is selected and the "detailed information" button 805 is pressed (instructed), the CPU 301 of the multifunction peripheral 300 displays detailed information of the selected job on the display unit of the operation unit 308. The detailed information of the job is supposed to have been received together with the job list, however, at a timing when the "detailed information" button 805 is pressed, the detailed information corresponding to a document name of the selected job may be acquired from the client PC 100 of an acquisition source of the job list in FIG. 8 and displayed.

In the job list display screen 801 in FIG. 8, when a job is selected, and the "delete" button 806 is pressed (instructed), the CPU 301 of the multifunction peripheral 300 transmits a delete instruction including the document name of the selected job to the client PC 100 of the acquisition source of the job list in FIG. 8.

The print module of the client PC 100, which has received the delete instruction, deletes the print data corresponding to the document name included in the delete instruction, from the spool region of the client PC 100 and the job list managed by the print module.

Next, a PIN code setting and a network environment necessary for calculation of a PIN code will be described with reference to FIG. 11 to FIG. 13. FIG. 11 illustrates an example of a UI of a PIN code setting in the client PC 100, which is displayed on the monitor 210 of the client PC 100 by the print module. FIG. 12 illustrates an example of the UI of the PIN code setting in the multifunction peripheral 300, which is displayed on the display unit of the operation unit 308 by the CPU 301.

Figure 11:
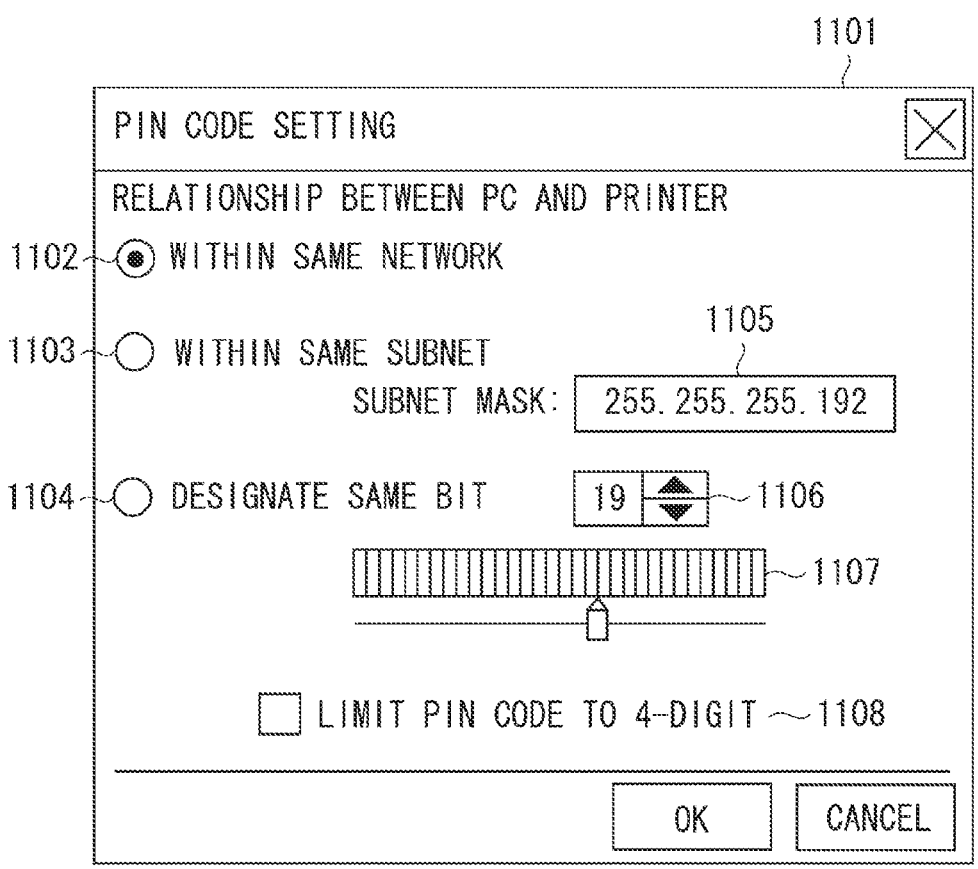
FIG. 11 illustrates an example of a user interface (UI) for PIN code setting in the client PC.
Figure 12:
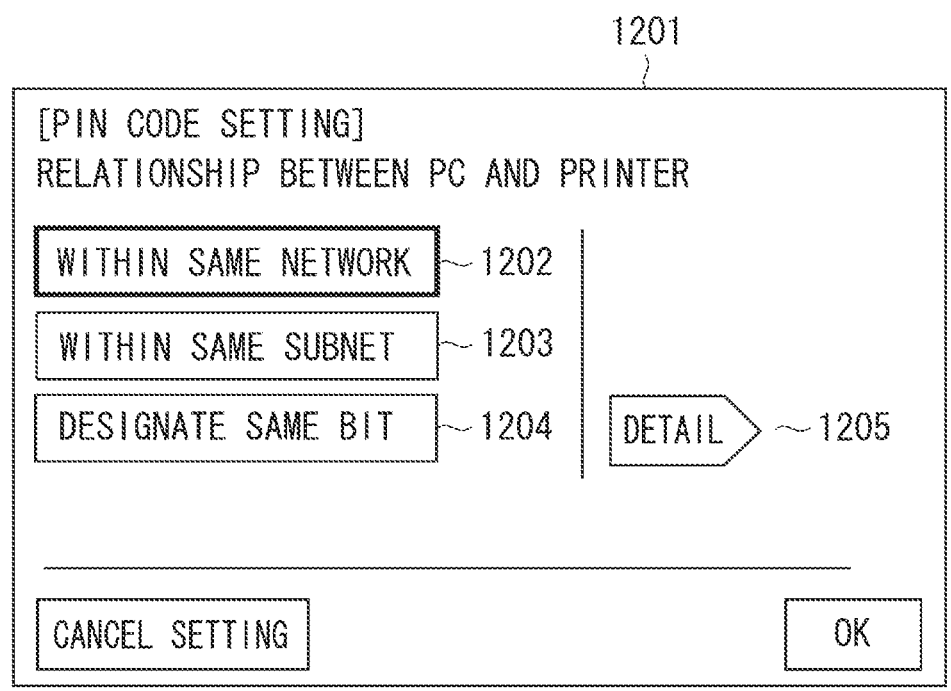
FIG. 12 illustrates an example of a UI for PIN code setting in the multifunction peripheral.

A system administrator needs to perform the PIN code setting in advance by the UIs illustrated in FIG. 11 and FIG. 12, in order to reduce a number of digits of the PIN code. The contents to be set in this process is a relationship on the network between the client PC 100 and the multifunction peripherals 300 in a targeted environment (i.e., relationship between both IP addresses, hereinafter, referred to as a network environment).

In a PIN code setting dialogue 1101 illustrated in FIG. 11, three types of the network environments can be designated, namely a "within same network" 1102, a "within same subnet" 1103, and a "designate same bit" 1104.

Similarly, in a PIN code setting dialogue 1201 illustrated in FIG. 12, three types of the network environments can be designated, namely a "within same network" 1202, a "within same subnet" 1203, and a "designate same bit" 1204.

Differences in the network environments in the above-described three types of designations will be described below with reference to FIG. 13. FIG. 13 illustrates three types of network environments representing relationships between the client PC 100 and the multifunction peripherals 300 in the present exemplary embodiment. In this case, the IP address of the client PC 100 for all three types is assumed to be "163.24.18.125".

The first network environment 1301, is an environment in which all the multifunction peripherals 300 exist within the same subnet as the client PC 100.

Figure 13:
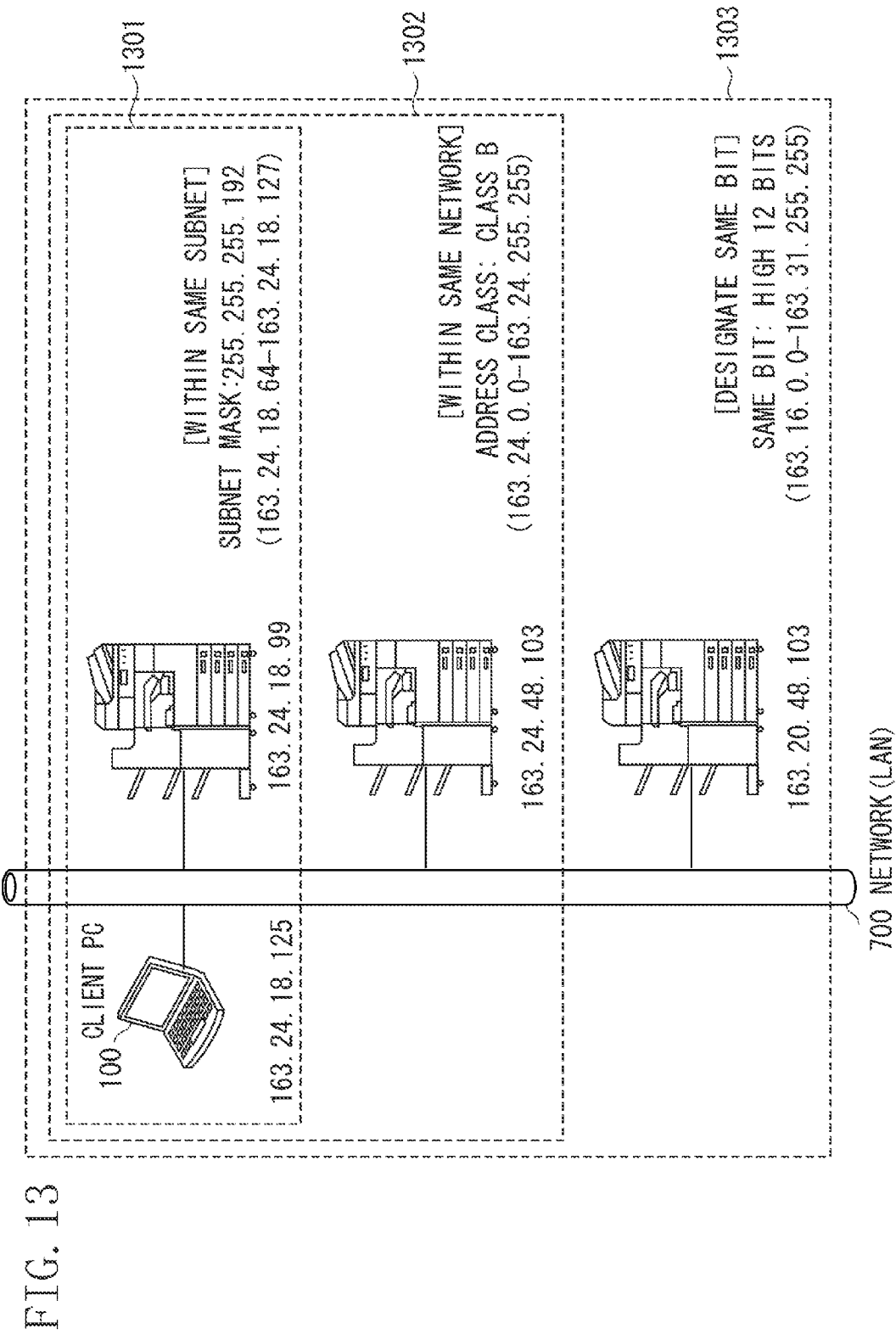
FIG. 13 illustrates three types of network environments indicating a relationship between the client PC and the multifunction peripheral in an exemplary embodiment of the present invention.

In the environments illustrated in FIG. 13, since a subnet mask is "255.255.255.192", all the multifunction peripherals 300 exist between "163.24.18.64" and "163.24.18.127".

In such a network environment, the system administrator selects the "within same subnet" 1103 in the PIN code setting dialogue 1101 on the client PC 100 illustrated in FIG. 11. Further, the system administrator inputs "255.255.255.192" into a region 1105 as the subnet mask. The subnet mask may be acquired by the print module from the setting of the client PC 100.

Similarly, in the PIN code setting screen 1201 illustrated in FIG. 12 on the multifunction peripheral 300, the system administrator selects a "within same subnet" 1203 and inputs "255.255.255.192" via a subnet mask input UI (not illustrated). The subnet mask input UI is provided on a screen which will be displayed when a detail button 1205 is pressed. Similarly, the subnet mask may be acquired by the CPU 301 of the multifunction peripheral 300 from the setting of the multifunction peripheral 300.

The second network environment 1302 is an environment in which all the multifunction peripherals 300 exist within the same network as the client PC 100. The same network means that network addresses of an address class determined by high-order bits of the IP addresses are the same.

In the environment illustrated in FIG. 13, the IP address of the client PC 100 is "163.24.18.125", and since high-order 2 bits are "10", it is found that it belongs to an address class of a class B. Since the default net mask of the class B is "255.255.0.0", all the multifunction peripherals 300 exist between "163.24.0.0" and "163.24.255.255".

In such a network environment, the system administrator selects a "within same network" 1102 in the PIN code setting dialogue 1101 on the client PC 100 illustrated in FIG. 11. Similarly, in the PIN code setting screen 1201 on the multifunction peripheral 300 illustrated in FIG. 12, the system administrator selects a "within same network" 1202.

The third network environment 1303 is an environment in which only a certain number of bits of high-order bits of the IP addresses of all the multifunction peripherals 300 and the client PC are the same. FIG. 13 illustrates an environment in which high-order 12 bits of the IP addresses are the same, and since the high 12 bits of the IP addresses is "101000110001", all the multifunction peripherals 300 exist between "163.16.0.0" and "163.31.255.255".

In such a network environment, the system administrator selects a "designate same bit" 1104 and inputs "12" into UIs 1106 or 1107 for designating a bit number in the PIN code setting dialogue 1101 on the client PC 100 illustrated in FIG. 11. Similarly, in the PIN code setting screen 1201 on the multifunction peripheral 300 illustrated in FIG. 12, the system administrator selects a "designate same bit" 1204 and inputs "12" via a bit number designation UI (not illustrated). The bit number designation UI is provided on a screen which will be displayed when the detail button 1205 is pressed. Similarly to a field 1108 in FIG. 11, setting of the "limit PIN code to 4-digit" can be designed to be performed on the same screen.

Next, a calculation method for a PIN code in the client PC 100 and a calculation method for an IP address in the multifunction peripheral 300 will be described, for each of the above-described three types of network environments.

In the present exemplary embodiment, the PIN code is a code which express the IP address of the client PC 100 by one decimal number. As described above, the user needs to memorize the PIN code to input into the PIN code input screen 702 of the multifunction peripheral 300, and accordingly a smaller number of digits would be desirable. In the present exemplary embodiment, the number of digits can be reduced by using the PIN code setting described above, and its concrete example will be illustrated in FIG. 14.

FIG. 14 illustrates the IP address "163.24.18.125" of the client PC in the exemplary embodiment expressed in a binary number. When the IP address is simply converted into decimal numbers, "2736263805" is obtained as illustrated in an item 1405, and the number of digits is many and thus it is difficult for the user to memorize it.

In the first network environment 1301 described above, since the "within same subnet" 1103 is selected in the PIN code setting dialogue 1101, up to high-order 26 bits to be calculated from the subnet mask can be omitted. Accordingly, a PIN code "61" (in an item 1402) can be obtained by converting the bits from high-order 27th bit to 32nd bit of the above-described the IP address into decimal numbers. In other words, the client PC 100 calculates a PIN code by converting only a host address portion, which is obtained by excluding a subnet address portion from its own IP address into decimal numbers.

In the second network environment 1302 described above, since the "within same network" 1102 is selected in the PIN code setting dialogue 1101, up to high-order 16 bits calculated from a default net mask (standard subnet mask) can be omitted. Accordingly, a PIN code "4733" (in an item 1401) can be obtained by converting the bits from high-order 17th bit to 32nd bit into decimal umbers. In other words, the client PC 100 calculates a PIN code by converting only a remainder portion after excluding default net mask portion (standard subnet mask portion) from its own IP address into decimal numbers.

In the third network environment 1303 described above, since the "designate same bit" 1104 in "12" bits is selected in the PIN code setting dialogue 1101, up to high-order 12 bits can be omitted. Accordingly, a PIN code "529021" (in an item 1403) can be obtained by converting the bits from high-order 13th bit to 24th bit into decimal numbers. In other words, the client PC 100 calculates a PIN code by converting a remainder portion after excluding a designated bit portion from its own IP address into decimal numbers.

As the same bits are smaller, a number of digits of the PIN code which the user needs to memorize will be increased. Therefore, a "limit PIN code to 4-digit" check box 1108 is provided in the PIN code setting dialogue 1101 illustrated in FIG. 11.

If the check box 1108 is set to "ON" and a designated bit is smaller than "19" bits, processing for converting only lower 13 bits into decimal numbers is performed. This is because, if 13 bits or less, the bits will be surely converted into numerical value of 4-digit or less, when converted into decimal numbers.

Since the designated same bit is "12" bits in the example of the environment 1303 in FIG. 13, which is smaller than 19 bits, a PIN code "4733" (in an item 1404) can be obtained by converting lower 13 bits, that is, from high-order 20th bit to 32nd bit into decimal numbers. In other words, in this case, the client PC calculates a PIN code by converting the lower 13 bits into decimal numbers from its own IP address.

Next, a calculation method for the IP address of the client PC 100 in the multifunction peripheral 300 will be described, for each of three types of network environments described above.

In the first network environment 1301 described above, since the "within same subnet" 1203 is selected in the PIN code setting screen 1201, up to high-order 26 bits calculated from the subnet masks of their own IP addresses are the same.

Therefore, a value input in the PIN code input screen 701 is converted into binary numbers, and the binary numbers are applied to the remaining bits from 27th bit to 32nd bit, which can be identified as the IP address of the relevant client PC 100.

In the examples in FIG. 13 and FIG. 14, the multifunction peripheral 300 can identify the IP address of the client PC 100 as "163.24.18.125" from its own IP address "163.24.18.99" and the input PIN code "61". More specifically, the multifunction peripheral 300 identifies the IP address of the client PC 100 as "163.24.18.125", by identifying the high-order 26 bits from its own IP address "163.24.18.99", and identifying the lower 6 bits from the input PIN code "61".

In other words, the multifunction peripheral 300 calculates the IP address of the client PC 100 by adding the input value to the host address portion with respect to the subnet address portion of its own IP address.

In the second network environment 1302 described above, the "within same network" 1203 is selected in the PIN code setting screen 1201, and up to high-order 16 bits calculated from the default net mask of their own IP addresses are the same. Therefore, a value input in the PIN code input screen 701 is converted into binary numbers, and the binary numbers are applied to the remaining bits from 17th bit to 32nd bit, which can be identified as the IP address of the relevant client PC 100.

In the examples in FIG. 13 and FIG. 14, the multifunction peripheral 300 can identify the IP address of the client PC as "163.24.18.125" from its own IP address "163.24.48.103" and the input PIN code "4733".

In other words, the multifunction peripheral 300 calculates the IP address of the client PC 100 by adding the input value to the remaining portion with respect to the default net address portion of its own IP address.

In the above-described third network environment 1303, the "designate same bit" 1204 of "12" bits is selected in the PIN code setting screen 1201, and up to high-order 12 bits of their own IP addresses are the same. Therefore, a value input in the PIN code input screen 701 is converted into binary numbers, and the binary numbers are applied to the remaining bits from 13th bit to 32nd bit, which is identified as the IP address of the relevant client PC 100.

In the examples in FIG. 13 and FIG. 14, the multifunction peripheral 300 can identify the IP address of the client PC as "163.24.18.125" from its own IP address "163.20.48.103" and the input PIN code "529021".

In other words, the multifunction peripheral 300 calculates the IP address of the client PC 100 by adding the input value to the remaining portion with respect to the designated bit portion of its own IP address. On the detail screen of the PIN code setting screen 1201, if setting of the "limit PIN code to 4-digit" has been made, different processing will be performed. As described above, the multifunction peripheral 300 assigns the same bits as its own IP address up to high-order 12 bits, and assigns bits obtained by converting the input PIN code into binary numbers to lower 13 bits. In other words, the remaining bits from high-order 13th bit to 19th bit become indefinite, and thus the IP address of the client PC 100 cannot be identified. In this case, the job list requests in step S605 in FIG. 6 are made on all possible IP addresses. If a number of indefinite bits is 7 bits, a total of 128 IP addresses will be targets.

In the examples in FIG. 13 and FIG. 14, the following 128 IP addresses calculated from the multifunction peripherals 300 own IP address "163.20.48.103" and the input PIN code "4733" will become targets. That is, "163.16.18.125", "163.16.50.125", 163.16.82.125", . . . , and "163.31.242.125".

In the present exemplary embodiment, the "limit PIN code to 4-digit" is described as an example, however, it is not limited to 4-digit. The present exemplary embodiment can be implemented with 5-digit or 6-digit.

As described above, the client PC 100 can generate a PIN code from a part of information of an IP address and reduce a number of digits of the PIN code based on a relationship on the network between the client PC and the multifunction peripheral designated by the PIN code setting UI. Accordingly, the possibility that the user may forget the PIN code can be reduced.

In the present exemplary embodiment, there is described an example in which the multifunction peripheral 300 requests a job list request from a plurality of IP addresses, if the user has forgotten the PIN code or a number of digits of the PIN code is limited.

In this case, if request is made to the plurality of IP addresses every time, a load of system becomes large. Generally, there is a high probability that the same user uses the PC with the same IP address. Hence, the multifunction peripheral 300 may store the IP addresses which are often used for each user (caches information for each print), and may implement the processing to request the job list from the IP addresses preferentially.

More specifically, the multifunction peripheral 300 firstly requests the job list from only the IP addresses which the user often uses, then only if there are no responses, requests the job list from the remaining plurality of IP addresses. Accordingly, the load of the system can be reduced.

The exemplary embodiment of the present invention is described as above with reference to the drawings. In the present exemplary embodiment, a multifunction peripheral is used as a printing apparatus. However, if a single-function printer including an operation unit is used, the functions of the present exemplary embodiment can be similarly implemented. Further, in the present exemplary embodiment, a system administrator needs to perform the PIN code settings to the client PCs 100 and to the multifunction peripherals 300. However, A tool may be used which can collectively perform settings to the respective client PCs 100 and to the respective multifunction peripherals 300.

Furthermore, in the present exemplary embodiment, examples of using three items, "within same network", "within same subnet", and "designate same bit" to reduce a number of digits of the PIN code are given. However, in order to reduce a number of digits of the PIN code, the present exemplary embodiment can be also implemented by using another designation method for representing a relationship on the network.

Moreover, in the present exemplary embodiment, descriptions is given based on an Internet Protocol version 4 (IPv4), however, the present exemplary embodiment can be similarly implemented by the use of an Internet Protocol version 6 (IPv6).

According to the present exemplary embodiment, in the serverless pull printing system, pull printing can be performed by directly connecting a desired printing apparatus and an information processing apparatus without establishing connection between unnecessary printing apparatuses (multifunction peripherals 300) and information processing apparatuses (client PCs 100). Further, connection across the subnet also becomes possible.

Structure and contents of the above-described various pieces of data are not limited thereto. Data can include various configurations and contents according to applications and purposes.

The exemplary embodiment of the present invention has been describe above, however exemplary embodiments of the present invention can be realized by, for example, a system, an apparatus, a method, a program, or a storage medium. More specifically, the present invention may be applied to a system including a plurality of devices, or may be applied to an apparatus including a single device.

Further, configurations with combination of the above-described respective exemplary embodiments are all included in the present invention.

The present invention can also be realized by executing the following processing. More specifically, software (a program) for realizing the functions of the above exemplary embodiments is supplied to a system or an apparatus via a network or various storage media and a computer (or CPU or micro processing unit (MPU)) of the system or the apparatus reads and executes the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-259766 filed Nov. 22, 2010, which is hereby incorporated by reference herein in its entirety.

What is claimed is:

1. A printing system in which a plurality of information processing apparatuses and printing apparatuses are connected to a network, at least one of the plurality of information processing apparatuses communicating with one of the printing apparatuses, the at least one of the information processing apparatuses comprising:
a setting unit configured to set condition information for generating identification information for identifying the information processing apparatus;
a spooling unit configured to generate and spool data for print as a function of a print module of the information processing apparatus according to a user's printing operation;
a generation unit configured to generate identification information for identifying the information processing apparatus from a part of an information of an internet protocol (IP) address of the information processing apparatus according to the set condition information;
a presentation unit configured to present the identification information generated by the generation unit to a user;
a first transmission unit configured to transmit, after the presentation by the presentation unit, to the printing apparatus a list of the data spooled by the spooling unit and user information of a user who has executed the printing operation, in response to a first request from the printing apparatus, the first request using the identification information; and
a second transmission unit configured to transmit, to the printing apparatus, generated print data corresponding to data selected at the printing apparatus from the list; and
the printing apparatus comprising:
an input unit configured to input the identification information;
a conversion unit configured to convert the identification information input from the input unit into an IP address;
a first request unit configured to make a first request to the information processing apparatus indicated by the IP address converted by the conversion unit;
a second request unit configured, when the user information transmitted by the first transmission unit has been authenticated, to make a second request for transmission of print data corresponding to the data selected from the list transmitted by the first transmission unit to the information processing apparatus indicated by the IP address converted by the conversion unit, and
a printing unit configured to receive and print the print data transmitted from the information processing apparatus in response to the second request.

2. The printing system according to claim 1, wherein the spooling unit spools data in an Enhanced Metafile (EMF) format as data for print, and
wherein print data transmitted by the second transmission unit is print data for the printing apparatus which is generated by a printer driver corresponding to the printing apparatus on which the print module performs control of installation in response to the second request from the printing apparatus.

3. An information processing apparatus capable of communicating with a printing apparatus via a network, the information processing apparatus comprising:
a setting unit configured to set condition information for generating identification information for identifying the information processing apparatus;
a spooling unit configured to generate and spool data for print as a function of a print module of the information processing apparatus according to a user's printing operation;
a generation unit configured to generate identification information for identifying the information processing apparatus from a part of an information of an IP address of the information processing apparatus according to the set condition information;
a presentation unit configured to present the identification information generated by the generation unit to a user;
a first transmission unit configured to transmit, after the presentation by the presentation unit, to the printing apparatus a list of the data spooled by the spooling unit and user information of a user who has executed the printing operation, in response to a request from the printing apparatus, the request using the identification information; and
a second transmission unit configured to transmit, to the printing apparatus, generated print data corresponding to data selected at the printing apparatus from the list,
wherein, in the printing apparatus, a data selection from the list is performed when the user information transmitted by the first transmission unit has been authenticated.

4. The information processing apparatus according to claim 3, wherein the spooling unit spools data in a format which does not depend on a model of the printing apparatus, as data for print, and
wherein print data transmitted by the second transmission unit is print data for the printing apparatus which is generated by a printer driver corresponding to the printing apparatus on which the print module performs control of installation in response to a request from the printing apparatus.

5. The information processing apparatus according to claim 3, wherein the presentation unit is further configured to warn a user to maintain the information processing apparatus in a state communicable with the printing apparatus in order to complete printing of the data spooled in the spooling unit along with the presentation of the identification information.

6. The information processing apparatus according to claim 3,
wherein the setting unit is configured to set, as the condition information, a relationship on the network between the information processing apparatus and the printing apparatus,
wherein the generation unit generates the identification information from a part of information of the IP address based on the relationship set by the setting unit.

7. The information processing apparatus according to claim 3, wherein the part of information of the IP address is obtained by excluding a subnet address portion of the IP address from the IP address.

8. The information processing apparatus according to claim 3, wherein the part of information of the IP address is obtained by excluding from the IP address a standard subnet mask portion of an address class to which the IP address belongs.

9. The information processing apparatus according to claim 3, wherein the part of information of the IP address is obtained by excluding from the IP address a specific number of high-order bits of the IP address.

10. A method for printing in a printing system in which a plurality of information processing apparatuses and printing apparatuses are connected to a network, the method comprising:

causing at least one of the plurality of information processing apparatuses to execute the following steps in connection with communicating with one of the printing apparatuses;
setting condition information for generating identification information for identifying the information processing apparatus;
generating and spooling data for print as a function of a print module of the information processing apparatus according to a user's printing operation;
generating identification information for identifying the information processing apparatus from a part of an information of an IP address of the printing apparatus according to the set condition information;
presenting the generated identification information to a user;
transmitting, after the presenting step, to the printing apparatus a list of the spooled data and user information of a user who has executed the printing operation, in response to a first request from the printing apparatus, the first request using the identification information; and
transmitting, to the printing apparatus, generated print data corresponding to data selected at the printing apparatus from the list;
wherein the transmissions to the printing apparatus cause the printing apparatus to execute:
inputting the identification information; converting the input identification information into an IP address;
making a first request to the information processing apparatus indicated by the converted IP address;
when the user information transmitted by the information processing apparatus has been authenticated, to make a second request for transmission of the print data corresponding to the data selected from the list of the spooled data to the information processing apparatus indicated by the converted IP address, and
receiving and printing the print data transmitted from the information processing apparatus in response to the second request.

11. A method for printing by an information processing apparatus capable of communicating with a printing apparatus via a network, the method comprising:
setting condition information for generating identification information for identifying the information processing apparatus;
generating and spooling data for print as a function of a print module of the information processing apparatus according to a user's printing operation;
generating identification information for identifying the information processing apparatus from apart of an information of an IP address of the information processing apparatus according to the set condition information;
presenting the generated identification information to a user;
transmitting, after the presenting step, to the printing apparatus a list of the data spooled by the spooling unit and user information of a user who has executed the printing operation, in response to a request from the printing apparatus, the request using the identification information; and
transmitting, to the printing apparatus, generated print data corresponding to data selected at the printing apparatus from the list,
wherein, in the printing apparatus, a data selection from the list is performed when the user information transmitted by the information processing apparatus has been authenticated.

12. A non-transitory computer readable storage medium on which is stored a computer program for making a computer execute a method for an information processing apparatus communicating with a printer via a network, the method comprising the steps of:
setting condition information for generating identification information for identifying the information processing apparatus;
generating and spooling data for print as a function of a print module of the information processing apparatus according to a user's printing operation;
generating identification information for identifying the information processing apparatus from a part of an information of an IP address of the information processing apparatus according to the set condition information;
presenting the generated identification information to a user;
transmitting, after the presenting step, to the printing apparatus a list of the data spooled by the spooling unit and user information of a user who has executed the printing operation, in response to a request from the printing apparatus, the request using the identification information; and
transmitting, to the printing apparatus, generated print data corresponding to data selected at the printing apparatus from the list,
wherein, in the printing apparatus, a data selection from the list is performed when the user information transmitted by the information processing apparatus has been authenticated.

* * * * *